United States Patent [19]

Juenemann et al.

[11] 4,276,045
[45] Jun. 30, 1981

[54] DYEING AND PRINTING OF CELLULOSIC TEXTILE MATERIAL

[75] Inventors: Werner Juenemann, Bad Durkheim; Gunther Lamm, Hassloch; Hermann Loeffler, Speyer, all of Fed. Rep. of Germany

[73] Assignee: BASF Aktiengesellschaft, Fed. Rep. of Germany

[21] Appl. No.: 164,006

[22] Filed: Jun. 30, 1980

[30] Foreign Application Priority Data

Jul. 30, 1979 [DE] Fed. Rep. of Germany ....... 2930919

[51] Int. Cl.³ .............................................. C09B 29/00
[52] U.S. Cl. ........................................... 8/471; 8/667; 8/670; 8/689; 8/918
[58] Field of Search .................... 8/471, 670, 689, 918

[56] References Cited

U.S. PATENT DOCUMENTS

| | | | |
|---|---|---|---|
| 3,706,525 | 12/1972 | Blackwell et al. | 8/532 |
| 3,856,772 | 12/1974 | Dunkelmann et al. | 8/532 |
| 3,998,802 | 12/1976 | Dehnert et al. | 8/532 |
| 4,042,578 | 8/1977 | Dehnert et al. | 8/532 |
| 4,146,535 | 3/1979 | Dehnert et al. | 8/532 |

Primary Examiner—A. Lionel Clingman
Attorney, Agent, or Firm—Oblon, Fisher, Spivak, McClelland & Maier

[57] ABSTRACT

A process for dyeing and printing cellulosic textile material, wherein the dye used is a compound of the general formula I

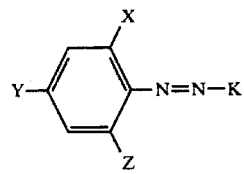

where
K is a radical of the formula

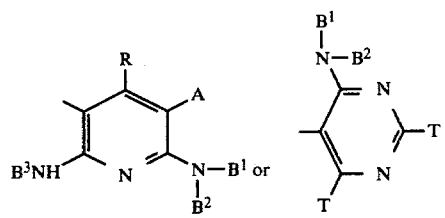

one of the radicals X and Y is a $C_2$–$C_{19}$-carboxylic acid ester group, a $C_3$–$C_{19}$-carboxamide group, a $C_4$–$C_{18}$-sulfonamide group, a $C_4$–$C_8$-alkylsulfone group, a $C_6$–$C_8$-arylsulfone group or a sulfonic acid aryl ester group and
the remaining substituents X, Y and Z are hydrogen, bromine or methyl and
Y may also be nitro,
A is cyano or carbamyl,
$B^1$, $B^2$ and $B^3$ independently of one another are aliphatic, cycloaliphatic, araliphatic or aromatic radicals,

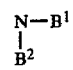

is a saturated heterocyclic radical,
R is hydrogen or $C_1$–$C_3$-alkyl,
one of the radicals T is a radical of the formula

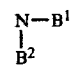

and
the other radical T is hydrogen, $C_1$–$C_4$-alkyl or phenyl.

3 Claims, No Drawings

DYEING AND PRINTING OF CELLULOSIC TEXTILE MATERIAL

The present invention relates to a process for dyeing and printing cellulosic textile material, wherein the dye used is a compound of the general formula I

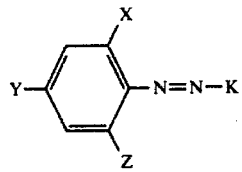

where
K is a radical of the formula

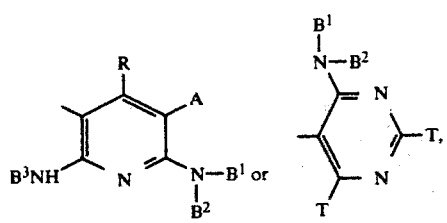

one of the radicals X and Y is a $C_2$–$C_{19}$-carboxylic acid ester group, a $C_3$–$C_{19}$-carboxamide group, a $C_4$–$C_{18}$-sulfonamide group, a $C_4$–$C_8$-alkylsulfone group, a $C_6$–$C_8$-arylsulfone group or a sulfonic acid aryl ester group,
X, Y and Z are hydrogen, bromine or methyl and
Y may also be nitro,
A is cyano or carbamyl,
$B^1$, $B^2$ and $B^3$ independently of one another are aliphatic, cycloaliphatic, araliphatic or aromatic radicals.

is a saturated heterocyclic radical,
R is hydrogen or $C_1$–$C_3$-alkyl,
one of the radicals T is a radical of the formula

and
the other radical T is hydrogen, $C_1$–$C_4$-alkyl or phenyl.
Radicals R, other than hydrogen, are ethyl, n- or i-propyl and preferably methyl.
Examples of $B^1$, other than hydrogen, are the following: alkyl of 1 to 8 carbon atoms; alkyl of 2 to 8 carbon atoms which is substituted by hydroxyl, cyano, alkoxy of 1 to 8 carbon atoms, phenoxy, phenoxyethoxy or benzyloxy; cyclohexyl, norbornyl, benzyl, phenylethyl, phenylhydroxyethyl, phenylpropyl and phenylbutyl; phenyl which may or may not be substituted by chlorine, methyl, trifluoromethyl, pyrrolidonyl, methoxy or ethoxy; $C_5$–$C_{12}$-polyalkoxyalkyl, $C_4$–$C_9$-hydroxypolyalkoxyalkyl, $C_1$–$C_8$-alkanoyloxy-$C_2$–$C_6$-alkyl, $C_7$–$C_{11}$-aroyloxy-$C_2$–$C_6$-alkyl, $C_1$–$C_8$-alkylaminocarbonyloxy-$C_2$–$C_6$-alkyl, $C_6$–$C_{10}$-arylaminocarbonyloxy-$C_2$–$C_6$-alkyl and $C_1$–$C_8$-alkoxycarbonyl-$C_2$–$C_7$-alkyl;

$C_1$–$C_{18}$-alkanoyl, $C_8$–$C_{10}$-aralkanoyl, $C_7$–$C_{11}$-aroyl, $C_1$–$C_4$-alkylsulfonyl and $C_6$–$C_{10}$-arylsulfonyl.

Specific examples of radicals $B^1$, in addition to those already mentioned, are:
1. Substituted or unsubstituted alkyl radicals:
   $CH_3$, $C_2H_5$, n- and i-$C_3H_7$, n- and i-$C_4H_9$, $C_6H_{13}$,

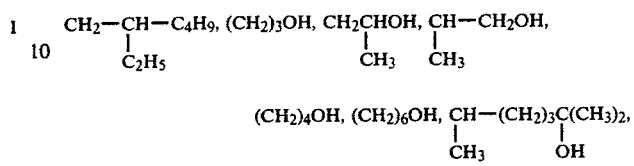

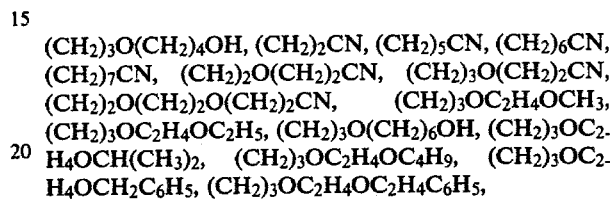

$(CH_2)_3O(CH_2)_4OH$, $(CH_2)_2CN$, $(CH_2)_5CN$, $(CH_2)_6CN$, $(CH_2)_7CN$, $(CH_2)_2O(CH_2)_2CN$, $(CH_2)_3O(CH_2)_2CN$, $(CH_2)_2O(CH_2)_2O(CH_2)_2CN$, $(CH_2)_3OC_2H_4OCH_3$, $(CH_2)_3OC_2H_4OC_2H_5$, $(CH_2)_3O(CH_2)_6OH$, $(CH_2)_3OC_2H_4OCH(CH_3)_2$, $(CH_2)_3OC_2H_4OC_4H_9$, $(CH_2)_3OC_2H_4OCH_2C_6H_5$, $(CH_2)_3OC_2H_4OC_2H_4C_6H_5$,

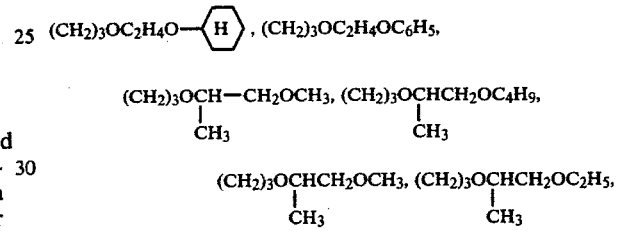

$CH_2CH_2COOH$, $(CH_2)_5COOH$, $(CH_2)_6COOH$,
the corresponding radicals in which the groups

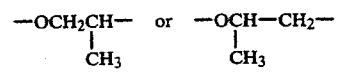

occur twice or three times,
$CH_2CH_2OCH_3$, $CH_2CH_2OC_2H_5$, $CH_2CH_2OC_3H_7$, $CH_2CH_2OC_4H_9$, $CH_2CH_2OC_6H_5$, $(CH_2)_3OCH_3$, $(CH_2)_3OC_2H_5$, $(CH_2)_3OC_3H_7$, $(CH_2)_3OC_4H_9$,

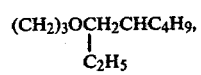

$(CH_2)_3OC_6H_{13}$, $(CH_2)_3OC_8H_{17}$, $(CH_2)_3OCH_2C_6H_5$, $(CH_2)_3OC_2H_4C_6H_5$, $(CH_2)_3OC_6H_5$,

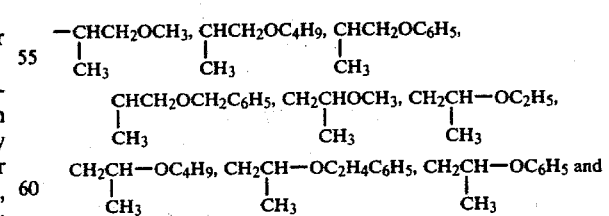

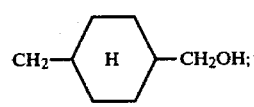

2. Unsubstituted and substituted cycloalkyl and polycycloalkyl radicals:

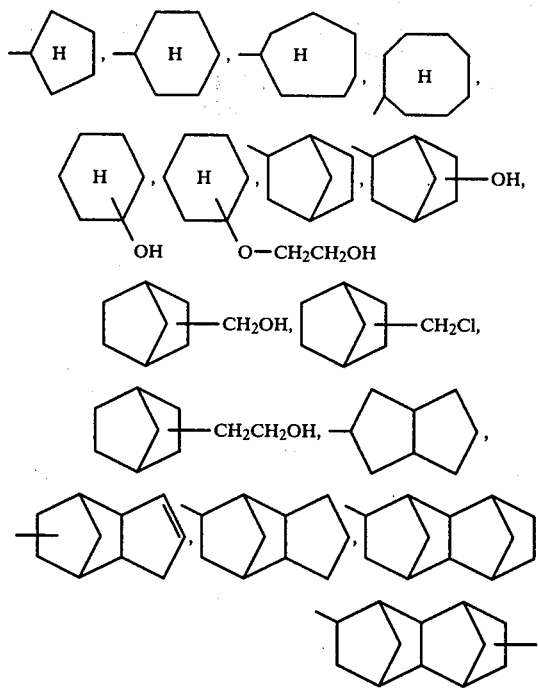

3. Aralkyl radicals:
CH₂C₆H₅, C₂H₄C₆H₅,

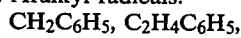

and the corresponding radicals containing C₆H₄CH₃ instead of C₆H₅.
4. Unsubstituted and substituted phenyl radicals:
C₆H₅, C₆H₄CH₃, C₆H₃(CH₃)₂, C₆H₄OCH₃, C₆H₄OC₂H₅, C₆H₄OCH₂CH₂OH and C₆H₄Cl;
5. The radicals:
CH₂CH=CH₂, CH₂COOCH₃, (CH₂)₅COOCH₃,

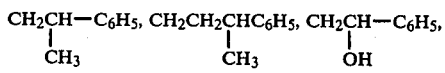

wherein n is 2, 3, 4 or 6.
6. Acyloxy radicals:
(CH₂)₂OCHO, (CH₂)₂OCOCH₃, (C₂H₄O)₂CHO, (C₂H₄O)₂COCH₃, (CH₂)₂OCOC₃H₇,

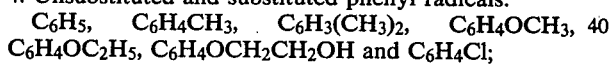

(CH₂)₂OCOC₆H₅, (CH₂)₂OCOC₆H₄CH₃, (CH₂)₂OCOC₆H₄Cl, (CH₂)₂OCOC₁₀H₇, (CH₂)₂OCONHCH₃, (CH₂)₂OCONHC₄H₉,

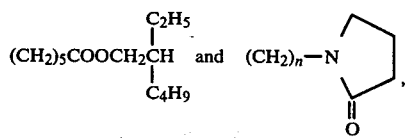

(CH₂)₂OCONHC₆H₅, (CH₂)₂OCONHC₆H₄Cl, (CH₂)₂OCONHC₆H₃Cl₂, and the corresponding radicals containing (CH₂)₃, (CH₂)₄ or (CH₂)₆ instead of (CH₂)₂.
7. Acyl radicals:
CHO, CH₃CO, C₂H₅CO, C₃H₇CO,

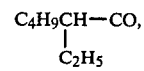

C₂H₅CO, CH₃C₆H₄CO, C₆H₅CH₂CO, C₆H₅OCH₂CO, CH₃SO₂, C₂H₅SO₂, C₆H₅SO₂ and CH₃C₆H₄SO₂.

Examples of preferred substituents are hydrogen, CH₃, C₂H₅, n- and i-C₃H₇, n- and i-C₄H₉, C₆H₁₃, (CH₂)₆OH,

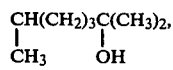

(CH₂)₃O(CH₂)₄OH, (CH₂)₃O(CH₂)₆OH, CH₂CH₂OCH₃, CH₂CH₂OC₂H₅, CH₂CH₂OC₄H₉, (CH₂)₃OCH₃, (CH₂)₃OC₂H₅, (CH₂)₃OC₃H₇, (CH₂)₃OC₄H₉,

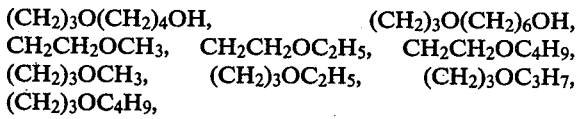

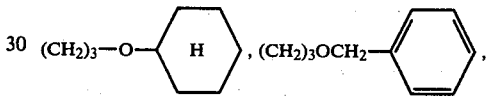

(CH₂)₃OC₂H₄OCH₃, (CH₂)₃OC₂H₄OC₄H₉, (CH₂)₃OC₂H₄OC₆H₅,

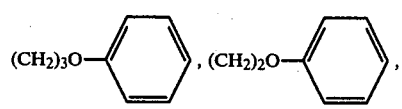

CH₂C₆H₅, C₂H₄C₆H₅,

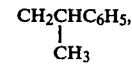

C₆H₅, C₆H₄CH₃, C₆H₄OCH₃ and C₆H₄OC₂H₄OH and (CH₂)₅COOH.

Examples of radicals

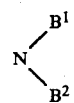

are pyrrolidino, piperidino, morpholino, piperazino or hexamethyleneimino.

Examples of carboxylic acid ester groups X and Y are:
COOC₄H₉(n), COO—CH₂—CH(CH₃)₂, COOC(CH₃)₃, COOC₄H₈Cl, COOC₅H₁₁—(n), COOCH₂C(CH₃)₃, COOC₆H₁₃,

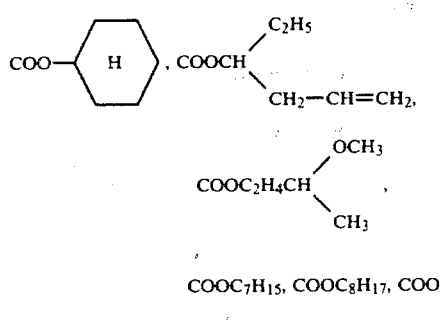

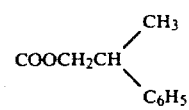

COOC$_9$H$_{19}$, COOC$_{10}$H$_{21}$, COOC$_{12}$H$_{25}$, COOC$_{16}$H$_{33}$, COOC$_{18}$H$_{37}$, COOC$_2$H$_4$OC$_2$H$_5$, COOC$_2$H$_4$OC$_4$H$_9$, COOC$_2$H$_4$OC$_6$H$_5$, COOCH$_2$C$_6$H$_5$, COOC$_2$H$_4$C$_6$H$_5$,

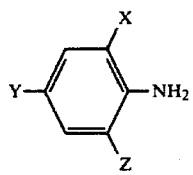

COOC$_2$H$_4$OC$_6$H$_5$, COO(C$_2$H$_4$O)$_2$CH$_3$, COO(C$_2$H$_4$O)$_2$C$_2$H$_5$, COO(C$_2$H$_4$O)$_2$C$_4$H$_9$, COO(C$_2$H$_4$O)$_3$C$_2$H$_5$ and COO(C$_2$H$_4$O)$_3$C$_4$H$_9$.

Examples of N-substituents of the carboxamides and sulfonamides are hydrogen, butyl, n-hexyl, phenyl, benzyl, phenylethyl, 2-phenylpropyl, 2-ethylhexyl, 1,5-dimethylhexyl, n-octyl, n-dodecyl, n-tridecyl, 6-methylheptyl, 3-(2-ethyl-hexoxy)-propyl, stearyl, cyclohexyl, β-methoxyethyl, β-butoxyethyl, γ-methoxypropyl, γ-butoxypropyl and γ-ethoxypropyl, as well as divalent radicals which form a pyrrolidide, piperidide or morpholide.

Examples of O-substituents of the sulfonic acid ester groups are phenyl, o-, m- and p-tolyl, o-, m- and p-chlorophenyl and 2,5-dichlorophenyl.

The dyes of the formula I may be prepared by reacting a diazo compound of an amine of the formula II

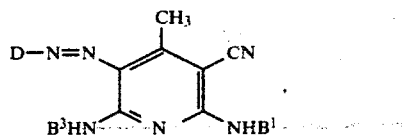

with a coupling component of the formula KH, where K, X, Y and Z have the stated meanings.

The diazotization of the amines is carried out in a conventional manner. The coupling is also carried out in a conventional manner, in an aqueous medium, with or without addition of a solvent, at a strongly to weakly acid pH.

Preferred dyes for the process according to the invention are those which correspond to the formulae

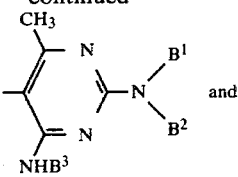

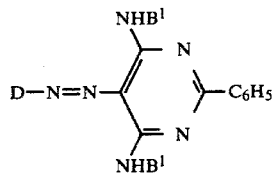

where B$^1$, B$^2$ and B$^3$ have the stated meanings and D is a radical of the formula

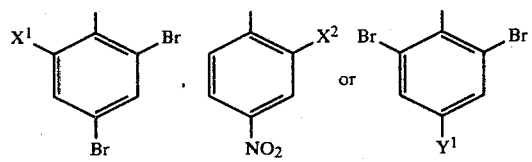

where

X$^1$ is a C$_4$–C$_{19}$-carboxylic acid ester group, a C$_4$–C$_{19}$-carboxamide group or a sulfonic acid phenyl ester group, X$_2$ is a C$_4$–C$_{19}$-carboxylic acid ester group or C$_4$–C$_{19}$-carboxamide group and Y$^1$ is a C$_4$–C$_{19}$-carboxylic acid ester group, a C$_4$–C$_{19}$-carboxamide group, a C$_6$–C$_{18}$-sulfonamide group or a sulfonic acid phenyl ester group which may or may not be substituted by chlorine or methyl.

Suitable processes for applying the dyes of the formula I are in particular those described in German Pat. No. 1,811,796, and German Patent Applications Nos. P 25 24 243, P 25 28 743 and P 28 55 188.4.

Details of the preparation and use of the dyes are to be found in the Examples, where parts and percentages are by weight, unless stated otherwise.

EXAMPLE 1

43.5 parts of decyl 3,5-dibromo-anthranilate are stirred in a mixture of 150 parts by volume of 100% strength acetic acid and 50 parts by volume of 100% strength propionic acid at from 0° to +5° C. 33 parts of a 42% strength nitrosylsulfuric acid are added dropwise to the mixture, and the batch is then stirred for about 30 minutes at from 0° to +5° C., until the amine has dissolved in the form of the diazonium salt. After excess nitrous acid has been removed with a small amount of aminosulfonic acid, the diazonium salt solution is run, at 0° C., into a mixture of 400 parts per volume of 85% strength acetic acid and 50 parts of sodium acetate, containing 15.5 parts of 2,6-diamino-3-cyano-4-methyl-pyridine in solution. After stirring the batch for several hours, whilst it gradually returns to room temperature, the dye is filtered off and washed salt-free with hot water.

A fabric of 65 parts of polyester fibers and 35 parts of mercerized cotton is impregnated with a liquor which contains 80 g/l of a 20% strength aqueous formulation of the above water-insoluble, golden yellow disperse dye of the formula

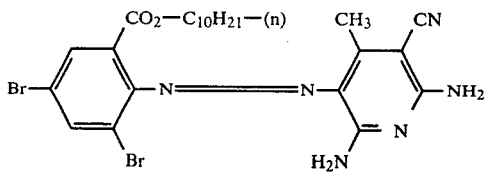

and 80 g/l of a swelling agent and dye solvent, comprising 80 parts of a polyethylene glycol of molecular weight 1,500 and 20 parts of a reaction product of 1 mole of hexamethylenediamine and 15 moles of ethylene oxide. The pH of the liquor is brought to 6 with citric acid.

The impregnated fabric is dried for 60 seconds at 120° C. and is then heated for 60 seconds at 215° C. to fix the dye. The fabric is then rinsed cold and hot and is soaped for 20 minutes at 100° C. in the presence of a commercial detergent.

A golden yellow dyeing having good lightfastness and fastness to crocking is obtained.

EXAMPLE 2

A polyester/cotton union fabric is printed with a formulation which consists of 10 parts of the dye from Example 1, 100 parts of a reaction product of a polyethylene oxide (of molecular weight 300) with boric acid in the molar ratio of 3:1, 30 parts of oleic acid diethanolamide and 860 parts of a 3% strength alginate thickener, and the print is dried at 110° C. It is then treated for 5 minutes with live steam at 185° C., rinsed cold and soaped at 100° C. with a commercial detergent. A lightfast, washfast and solvent-fast golden yellow print on a white ground is obtained.

Using the same process on a pure cotton fabric, an equally fast print, of the same hue, is obtained.

EXAMPLE 3

32.2 parts of n-decyl 5-nitro-anthranilate are used as the diazo component, and 20.2 parts of 2,6-bis-ethylamino-3-cyano-4-methylpyridine as the coupling component under the conditions of Example 1; the dye of the formula

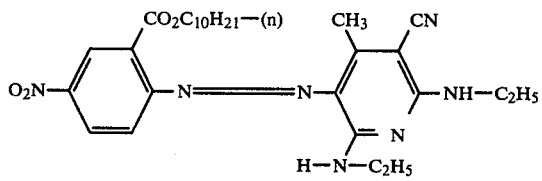

is obtained.

A 65:35 polyester/cotton union fabric is printed with a paste which consists of 20 parts of this dye, 100 parts of polyethylene oxide of molecular weight 350, 30 parts of oleic acid diethanolamide and 840 parts of a 10% strength alginate thickener. The printed material is dried at 100° C. and is then fixed in 60 seconds with hot air at 190°–215° C. The print is then rinsed cold and hot and soaped at 100° C., using a commercial detergent. A bluish red print, having good lightfastness, washfastness and fastness to crocking, is obtained on a white ground.

EXAMPLE 4

Using the conditions of Example 1, but with equivalent amounts of 2-(β'-butoxyethoxy)-ethyl 5-nitroanthranilate and 2,6-bis-(β-phenyl-ethyl-amino)-3-cyano-4-methyl-pyridine, the dye of the formula

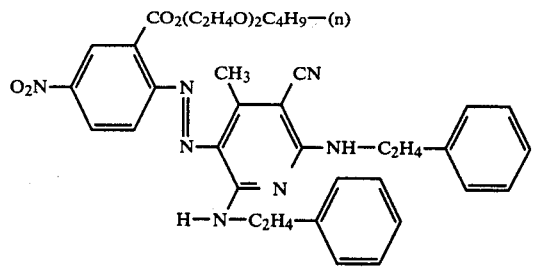

is obtained.

A mercerized cotton twill is impregnated with an aqueous dye liquor which contains 80 g/l of the above dye and 200 g of a mixture of 80 parts of polyethylene glycol, of molecular weight 800, and 20 parts of a block polymer of 1 mole of ethylenediamine, 8 moles of propylene oxide and 8 moles of ethylene oxide. The pH of the liquor is brought to 6 with citric acid. The wet pick-up is 52%.

The fabric is then dried in a conventional manner at 120° C., and fixed for 30 seconds at 215° C. in a laboratory dryer. After rinsing and washing, a very fast, intense red dyeing is obtained, with very slight dye loss.

EXAMPLE 5

Using the conditions of Example 1, but with equivalent amounts of β-phenylethyl anthranilate and 2-(β-phenylethyl-amino)-3-cyano-4-methyl-6-amino-pyridine, the dye of the formula

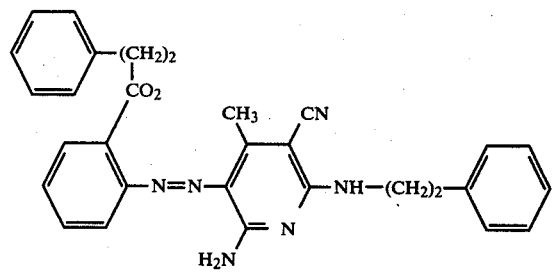

is obtained.

A fabric of 67 parts of polyester fibers and 33 parts of mercerized cotton is impregnated with a liquor which contains 100 g/l of a mixture of 80 parts of a boric acid ester of polyethylene glycol (molecular weight about 800) in the molar ratio of 1:3 and 20 parts of a reaction product of ethylenediamine with 35 moles of ethylene oxide. The wet pick-up is 80%. The fabric is dried for 15 minutes at 60°–70° C.

The treated fabric is printed with the following print paste:

| | |
|---|---|
| 500 | parts of a 10% strength aqueous starch-ether thickener |
| 2 | parts of citric acid |
| 10 | parts of sodium m-nitrobenzenesulfonate |
| 50 | parts of the above dye |
| x | parts of water |
| 1,000 | parts |

Following fixing and afterwashing, a red print is obtained.

EXAMPLE 6

A fabric of 65 parts of polyester fibers and 35 parts of mercerized cotton is impregnated with a dye liquor which contains 20 g/l of a 20% strength formulation of the dye of the formula

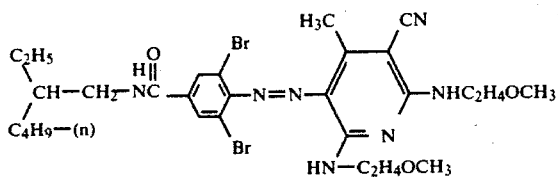

and, as a swelling agent and dye solvent, 60 g/l of a mixture of 1 part of a reaction product of 1 mole of i-octylphenol with 14 moles of ethylene oxide and 2 parts of a reaction product of 1 mole of piperazine with 16 moles of ethylene oxide. The pH of the liquor is brought to 6 with glutaric acid. The fabric is dried for only 60 seconds at 120° C. and the dye is then fixed for 30 seconds at 225° C. The fabric is rinsed cold and hot and is washed at 100° C. in the presence of a commercial detergent. A yellowish orange dyeing having good washfastness and lightfastness is obtained.

EXAMPLE 7

24 parts of 4-amino-3,5-dibromobenzoic acid (2-ethylhexyl)-amide are dissolved in 105 parts of glacial acetic acid and 15 parts by volume of concentrated hydrochloric acid are added. After cooling the mixture to 10°-15° C., 15 parts by volume of 23% strength aqueous sodium nitrite solution are run in and after stirring the mixture for 2 hours at 10°-15° C. the excess nitrous acid is destroyed in a conventional manner by adding an aqueous amidosulfonic acid solution.

The resulting solution of the diazonium salt is added gradually, at 0°-5° C., to a mixture of 14.6 g of 2,6-bis-(methoxypropylamino)-3-cyano-4-methylpyridine, 1,050 parts of glacial acetic acid, 50 parts of water and 200 parts of ice. 50 parts of sodium acetate are also added and the mixture is stirred until coupling is complete. It is then worked up by running 1,500 parts of water into the coupling solution, filtering off the precipitate, washing it with water and drying it. 31 parts of an orange powder of the formula A cotton fabric is printed, by rotary screen printing, with an ink which consists of 15 parts of the above dye, 100 parts of polyethylene oxide of molecular weight 300 and 790 parts of a 3% strength alginate thickener, and the print is dried at 100° C. It is then treated for 1 minute with hot air at 200° C., rinsed cold, soaped at the boil, again rinsed cold, and dried. A lightfast and washfast yellowish orange print on a white ground is obtained.

EXAMPLE 8

A polyester/cotton union fabric (weight ratio 50:50) is impregnated with an aqueous liquor which contains 20 g/l of a 20% strength formulation of the dye of the formula

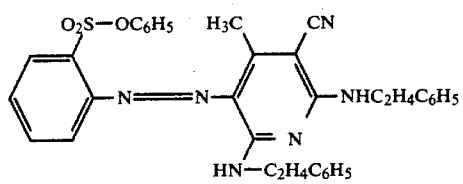

and, as a swelling agent and dye solvent, 50 g/l of a mixture of 80 parts of a polyethylene glycol of molecular weight 600 and 20 parts of a reaction product of 1 mole of triethanolamine with 14 moles of ethylene oxide. The pH of the liquor is brought to 7 with glutaric acid. The fabric is dried for 60 seconds at 120° C. and then heated for 90 seconds at 210° C. It is then rinsed cold and hot and washed for 5 minutes at 100° C. in the presence of a commercial detergent. A lightfast and washfast golden yellow dyeing is obtained.

EXAMPLE 9

22.12 parts of 4-amino-3,5-dibrombenzenesulfonic acid (2-ethylhexyl)-amide in 100 parts by volume of glacial acetic acid are stirred with 15 parts by volume of concentrated hydrochloric acid, and 15 parts by volume of a 23% strength aqueous sodium nitrite solution are added at 10°-15° C. The mixture is diluted with a further 62 parts by volume of glacial acetic acid and is stirred for 2 hours at 10°-15° C. After removing excess nitrous acid in a conventional manner, the diazotization mixture is added dropwise, at 0°-5° C., to a mixture of 16.95 parts of 6-amino-3-cyano-4-methyl-2-phenoxyethoxypropylaminopyridine, 1,050 parts of glacial acetic acid, 50 parts of water and 200 parts of ice. 100 parts of sodium acetate are then also added and the mixture is stirred until coupling is complete. The dye which has formed is filtered off, washed with water and dried. 28 parts of an orange powder of the formula

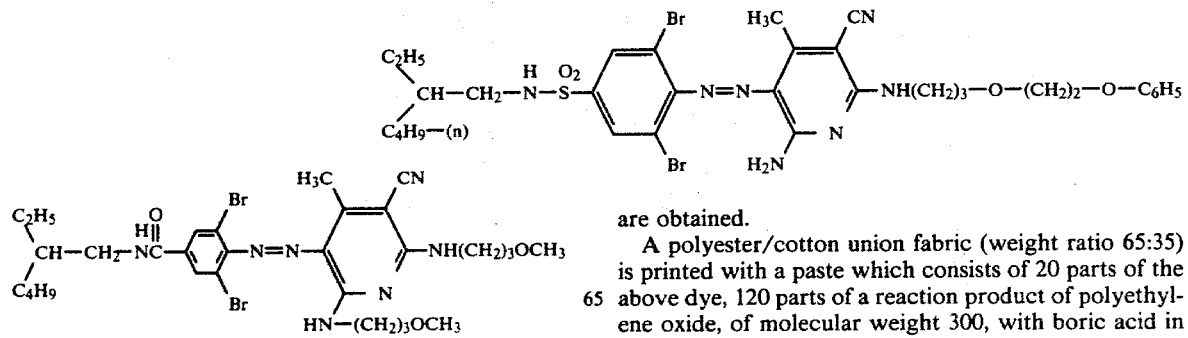

are obtained.

A polyester/cotton union fabric (weight ratio 65:35) is printed with a paste which consists of 20 parts of the above dye, 120 parts of a reaction product of polyethylene oxide, of molecular weight 300, with boric acid in the molar ratio of 3:1 and 860 parts of a 10% strength alginate thickener. The print is dried at 105° C. and are obtained.

treated with live steam at 180° C. for 6 minutes. It is then rinsed with cold water, soaped at 80° C., rinsed cold and dried. A lightfast and washfast golden yellow print on a white ground is obtained.

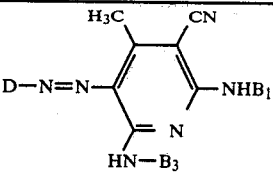

| Example | D | $B_1$ | $B_3$ | Hue on polyester/cotton |
|---|---|---|---|---|
| 10 | 2-methylphenyl-$CO_2C_{10}H_{21}$—(n) | H | H | golden yellow |
| 11 | " | $C_4H_9$—(n) | H | " |
| 12 | " | $C_2H_4$—phenyl | H | " |
| 13 | " | $C_3H_6$—O—$C_2H_4$—O—phenyl | H | " |
| 14 | " | $C_4H_9$—(n) | $C_4H_9$—(n) | " |
| 15 | 3,5-dibromo-2-methylphenyl-$CO_2C_{10}H_{21}$—(n) | $C_4H_9$—(n) | H | " |
| 16 | " | $C_2H_4$—phenyl | H | " |
| 17 | " | $C_2H_4OCH_3$ | H | " |
| 18 | " | $C_3H_6$—O—$C_4H_8$—OH | H | " |
| 19 | " | $C_4H_9$—(n) | $C_4H_9$—(n) | " |
| 20 | " | $C_3H_6OCH_3$ | $C_3H_6OCH_3$ | " |
| 21 | " | $C_2H_4$—O—$C_4H_9$—(n) | H | " |
| 22 | " | phenyl | H | " |
| 23 | " | " | $C_2H_4$—O—$C_4H_9$—(n) | " |
| 24 | " | $C_3H_6$—O—$C_2H_5$ | $C_3H_6$—O—$C_2H_5$ | " |
| 25 | " | $C_2H_5$ | $C_2H_5$ | " |
| 26 | " | $C_2H_4$—O—$CH(CH_3)_3$ | $C_2H_4$—O—$CH(CH_3)_3$ | " |
| 27 | " | phenyl | $C_2H_4OCH_3$ | " |
| 28 | 3,5-dibromo-2-methylphenyl-$CO_2C_{12}H_{25}$—(n) | H | H | " |
| 29 | " | $C_4H_9$ | H | " |
| 30 | " | $C_2H_4$—phenyl | H | " |
| 31 | " | $C_3H_6$—O—$C_2H_5$ | H | " |
| 32 | " | $C_2H_4$—O—$C_4H_9$—(n) | $C_2H_4$—O—$C_4H_9$—(n) | " |
| 33 | 2-methylphenyl-$CO_2C_{10}H_{21}$—(i) | H | H | " |
| 34 | " | $C_2H_4$—O—$C_4H_9$—(n) | H | " |
| 35 | " | $C_2H_4$—phenyl | H | " |
| 36 | 3,5-dibromo-2-methylphenyl-$CO_2C_{10}H_{21}$—(i) | H | H | " |
| 37 | " | $C_2H_4OCH_3$ | H | " |
| 38 | " | $C_4H_9$—(n) | H | " |
| 39 | " | $C_3H_6$—O—$C_4H_8$—OH | H | " |

-continued

| # | Col A | Col B | Col C | Col D |
|---|---|---|---|---|
| 40 | " | C$_4$H$_9$—(n) | C$_4$H$_9$—(n) | " |
| 41 | " | C$_2$H$_4$—O—C$_4$H$_9$—(n) | C$_2$H$_4$—O—C$_4$H$_9$—(n) | " |
| 42 | " | C$_3$H$_6$OCH$_3$ | C$_3$H$_6$OCH$_3$ | " |
| 43 |  (n)-H$_{21}$C$_{10}$—O$_2$C—C$_6$H$_4$— | H | H | " |
| 44 | " | C$_4$H$_9$—(n) | H | " |
| 45 | " | C$_2$H$_4$—C$_6$H$_5$ | | |
| 46 |  (n)-H$_{21}$C$_{10}$—O$_2$C—C$_6$H$_2$Br$_2$— | H | H | " |
| 47 | " | C$_2$H$_4$OCH$_3$ | H | " |
| 48 | " | C$_4$H$_9$—(n) | H | " |
| 49 | " | " | C$_4$H$_9$—(n) | " |
| 50 | " | C$_2$H$_4$—O—C$_4$H$_9$—(n) | C$_2$H$_4$—O—C$_4$H$_9$—(n) | " |
| 51 | 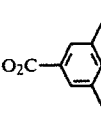 CO$_2$CH$_2$CH(C$_2$H$_5$)C$_4$H$_9$(n) on tolyl | H | H | " |
| 52 | " | C$_4$H$_9$—(n) | H | " |
| 53 |  CO$_2$CH$_2$CH(C$_2$H$_5$)C$_4$H$_9$(n) on dibromotolyl | H | H | " |
| 54 | " | C$_4$H$_9$—(n) | C$_4$H$_9$—(n) | " |
| 55 | " | C$_2$H$_4$—C$_6$H$_5$ | H | " |
| 56 | 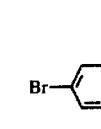 CO$_2$(C$_2$H$_4$O)$_2$C$_4$H$_9$ on dibromotolyl | H | H | " |
| 57 | " | C$_4$H$_9$—(n) | H | " |
| 58 | " | C$_2$H$_4$—C$_6$H$_5$ | H | " |
| 59 |  CO$_2$—C$_2$H$_4$—C$_6$H$_5$ on tolyl | C$_4$H$_9$—(n) | H | " |
| 60 | " | C$_3$H$_6$—O—C$_2$H$_4$—O—C$_6$H$_5$ | H | " |
| 61 | 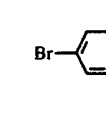 CO$_2$—C$_2$H$_4$—O—C$_6$H$_5$ on tolyl | C$_2$H$_4$—C$_6$H$_5$ | H | " |
| 62 |  CO$_2$—C$_6$H$_5$ on tolyl | C$_4$H$_9$—(n) | H | " |
| 63 | " | CH$_2$—CH(C$_2$H$_5$)C$_4$H$_9$—(n) | H | " |
| 64 | " | C$_2$H$_4$—C$_6$H$_5$ | H | " |
| 65 | " | C$_3$H$_6$—O—C$_2$H$_4$—O—C$_6$H$_5$ | H | " |
| 66 | " | C$_3$H$_6$—O—C$_2$H$_5$ | C$_3$H$_6$—O—C$_2$H$_5$ | " |

-continued

| No. | R | R' | R'' | Color |
|---|---|---|---|---|
| 67 | 3,5-dibromo-2-methyl-benzoate $CO_2C_2H_4OC_2H_5$ | $-C_2H_4-$phenyl | H | |
| 68 | 5-nitro-2-methyl-benzoate $CO_2C_{10}H_{21}-(n)$ | H | H | orange |
| 69 | " | $C_2H_4-OCH_3$ | H | yellowish red |
| 70 | " | $C_2H_4-OC_4H_9-(n)$ | H | " |
| 71 | " | $C_3H_6-OCH_3$ | H | " |
| 72 | " | $C_3H_6-OC_2H_5$ | H | " |
| 73 | " | $C_4H_9-(n)$ | H | " |
| 74 | " | phenyl | H | " |
| 75 | " | $C_2H_4-$phenyl | H | " |
| 76 | " | $C_3H_6-O-C_4H_8-OH$ | H | " |
| 77 | " | $C_3H_6-O-C_2H_4-O-$phenyl | H | " |
| 78 | " | cyclohexyl | H | " |
| 79 | " | $C_2H_4-OCH_3$ | $C_2H_4-OCH_3$ | red |
| 80 | " | $C_2H_4-OC_4H_9-(n)$ | $C_2H_4-OC_4H_9-(n)$ | " |
| 81 | " | $C_3H_6-OCH_3$ | $C_3H_6-OCH_3$ | " |
| 82 | " | $C_3H_6-OC_2H_5$ | $C_3H_6-OC_2H_5$ | " |
| 83 | " | $C_4H_9-(n)$ | $C_4H_9-(n)$ | " |
| 84 | " | $C_2H_4-$phenyl | $C_2H_4-$phenyl | " |
| 85 | " | $C_3H_6-O-C_2H_4-O-$phenyl | $C_2H_4-OCH_3$ | " |
| 86 | " | phenyl | $C_2H_4-OCH_3$ | " |
| 87 | " | $CH_2$-tetrahydrofuranyl | $CH_2$-tetrahydrofuranyl | " |
| 88 | " | $C_2H_4-$phenyl | $C_2H_4OCH_3$ | " |
| 89 | " | $(C_2H_4-OCH_3)_2$ | $C_2H_4OCH_3$ | " |
| 90 | " | cyclohexyl | cyclohexyl | " |
| 91 | 5-nitro-2-methyl-benzoate $CO_2C_{10}H_{21}-(i)$ | H | H | orange |
| 92 | " | $C_4H_9-(n)$ | H | yellowish red |
| 93 | " | $C_2H_4-$phenyl | H | " |
| 94 | " | $C_2H_4-OC_4H_9-(n)$ | H | " |
| 95 | " | $C_2H_4-OC_4H_9-(n)$ | $C_2H_4-OC_4H_9-(n)$ | red |
| 96 | " | $C_3H_6-OC_2H_5$ | $C_3H_6-OC_2H_5$ | " |
| 97 | " | $C_2H_4-$phenyl | $C_2H_4-$phenyl | " |
| 98 | " | $C_3H_6-O-C_2H_4-OCH_3$ | $C_3H_6-O-C_2H_4-OCH_3$ | " |
| 99 | 5-nitro-2-methyl-benzoate $CO_2(C_2H_4O)_2C_4H_9$ | $C_3H_6-O-C_2H_4-O-$phenyl | H | yellowish red |
| 100 | " | $C_2H_4-$phenyl | H | red |
| 101 | " | $C_2H_4-OC_4H_9-(n)$ | $C_2H_4-OC_4H_9-(n)$ | " |
| 102 | " | $C_3H_6-OC_2H_5$ | $C_3H_6-OC_2H_5$ | " |
| 103 | " | $C_4H_9-(n)$ | $C_4H_9-(n)$ | " |

-continued
| 104 | " |  |  | " |
| 105 | 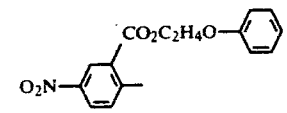 | C₄H₉—(n) | H | yellowish red |
| 106 | " | C₂H₄—OC₄H₉—(n) | H | " |
| 107 | " | C₂H₄— | H | " |
| 108 | " | C₃H₆—O—C₂H₄—O— | H | " |
| 109 | " | C₂H₄—OC₄H₉(n) | C₂H₄—OC₄H₉(n) | red |
| 110 | " | C₃H₆OCH₃ | C₃H₆OCH₃ | " |
| 111 | " | C₄H₉—(n) | C₄H₉—(n) | " |
| 112 | " | C₂H₄—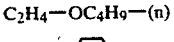 | C₂H₄— | " |
| 113 | " | C₃H₆—O—C₂H₄—O— | C₃H₆—O—C₂H₄—O— | " |
| 114 | " |  |  | " |
| 115 | 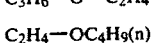 | 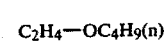 | H | " |
| 116 | 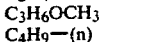 | C₃H₆OCH₃ | 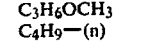 | " |
| 117 | " | " | 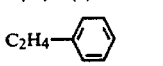 | " |
| 118 | " | 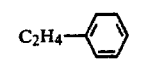 |  | " |
| 119 |  | (CH₂)₃OCH₃ | (CH₂)₃OCH₃ | orange |
| 120 | " | (CH₂)₂OCH₃ | " | " |
| 121 | 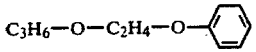 | " | " | " |
| 122 | 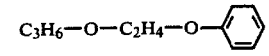 | C₂H₄— | C₂H₄— | " |
| 123 | 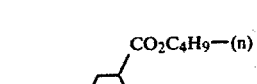 | (CH₂)₃OCH₃ | (CH₂)₃OCH₃ | " |
| 124 |  | C₂H₄OCH₃ | H | yellowish red |
| 125 | " | C₂H₄—OC₄H₉—(n) | H | " |
| 126 | " | C₃H₆—OCH₃ | H | " |
| 127 | " | C₃H₆—OC₂H₅ | H | " |

-continued

| Example | D | B1 | B3 | Hue on polyester/cotton |
|---|---|---|---|---|
| 128 | " | C$_2$H$_4$—⟨phenyl⟩ | H | " |
| 129 | " | C$_3$H$_6$—O—C$_2$H$_4$—O—⟨phenyl⟩ | H | " |
| 130 | " | C$_3$H$_6$—O—C$_4$H$_8$—OH | H | " |
| 131 | " | C$_2$H$_5$ | C$_2$H$_5$ | red |
| 132 | " | C$_2$H$_4$—OCH$_3$ | C$_2$H$_4$—OCH$_3$ | " |
| 133 | " | C$_2$H$_4$—OC$_4$H$_9$—(n) | C$_2$H$_4$—OC$_4$H$_9$—(n) | " |
| 134 | " | C$_3$H$_6$—OCH$_3$ | C$_3$H$_6$—O—C$_4$H$_8$—OH | " |
| 135 | " | C$_3$H$_6$—OCH$_3$ | C$_3$H$_6$—OCH$_3$ | " |
| 136 | " | C$_3$H$_6$—OC$_2$H$_5$ | C$_3$H$_6$—OC$_2$H$_5$ | " |
| 137 | " | C$_4$H$_9$—(n) | C$_4$H$_9$—(n) | " |
| 138 | " | C$_2$H$_4$—⟨phenyl⟩ | C$_2$H$_4$—⟨phenyl⟩ | " |
| 139 | 2-methyl-5-nitro-phenyl-CO$_2$—benzyl | C$_2$H$_4$—OC$_4$H$_9$—(n) | H | yellowish red |
| 140 | " | C$_3$H$_6$—OC$_2$H$_5$ | H | " |
| 141 | " | C$_3$H$_6$—O—C$_4$H$_8$—OH | H | " |
| 142 | " | C$_2$H$_4$—OC$_4$H$_9$—(n) | C$_2$H$_4$—OC$_4$H$_9$—(n) | red |
| 143 | " | C$_3$H$_6$—OCH$_3$ | C$_3$H$_6$—O—C$_4$H$_8$—OH | " |
| 144 | " | C$_3$H$_6$—OCH$_3$ | C$_3$H$_6$—OCH$_3$ | " |
| 145 | " | C$_2$H$_4$—OCH$_3$ | C$_2$H$_4$—OCH$_3$ | " |
| 146 | " | C$_3$H$_6$—OC$_2$H$_5$ | C$_3$H$_6$—OC$_2$H$_5$ | " |
| 147 | " | C$_4$H$_9$—(n) | C$_4$H$_9$—(n) | " |
| 148 | 2-methyl-5-nitro-phenyl-CO$_2$C$_6$H$_{13}$—(n) | C$_2$H$_4$—OC$_4$H$_9$—(n) | H | yellowish red |
| 149 | " | C$_3$H$_6$—OC$_2$H$_5$ | H | " |
| 150 | " | C$_2$H$_4$—⟨phenyl⟩ | H | " |
| 151 | " | C$_2$H$_4$—OC$_4$H$_9$—(n) | C$_2$H$_4$—OC$_4$H$_9$—(n) | red |
| 152 | " | C$_3$H$_6$—OC$_2$H$_5$ | C$_3$H$_6$—OC$_2$H$_5$ | " |
| 153 | " | C$_4$H$_9$—(n) | C$_4$H$_9$—(n) | " |
| 154 | " | C$_2$H$_4$—⟨phenyl⟩ | C$_2$H$_4$—⟨phenyl⟩ | " |
| 155 | 2-methyl-5-nitro-phenyl-CO$_2$—cyclohexyl | C$_3$H$_6$—O—C$_2$H$_4$—O—⟨phenyl⟩ | H | yellowish red |
| 156 | " | C$_2$H$_4$—OCH$_3$ | C$_2$H$_4$—OCH$_3$ | red |
| 157 | " | C$_3$H$_6$—OCH$_3$ | C$_3$H$_6$—OCH$_3$ | " |
| 158 | " | C$_2$H$_4$—⟨phenyl⟩ | C$_2$H$_4$—⟨phenyl⟩ | " |
| 159 | 2-methyl-5-nitro-phenyl-CO$_2$CH$_2$—⟨phenyl⟩ | C$_3$H$_6$OCH$_3$ | —⟨cyclohexyl⟩ | " |
| 160 | " | C$_3$H$_6$—OCH$_3$ | C$_3$H$_6$—OCH$_3$ | " |
| 161 | " | C$_2$H$_4$—O—C$_4$H$_9$—(n) | C$_2$H$_4$—O—C$_4$H$_9$—(n) | " |
| 162 | " | —⟨cyclohexyl⟩ | —⟨cyclohexyl⟩ | " |

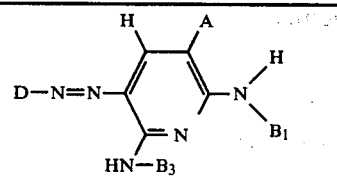

| Example | D | A | B$_1$ | B$_3$ | Hue on polyester/cotton |
|---|---|---|---|---|---|
| 163 | 2-methyl-phenyl-CO$_2$C$_{10}$H$_{21}$—(n) | CONH$_2$ | C$_4$H$_9$—(n) | H | golden yellow |

-continued

| | | | | | |
|---|---|---|---|---|---|
| 164 | (n)-H₂₁C₁₀O₂C-[phenyl] | CONH₂ | C₂H₄-[phenyl] | H | " |
| 165 | [phenyl with CO₂C₁₀H₂₁-(n), Br, Br] | CONH₂ | " | H | " |
| 166 | " | CN | C₄H₉-(n) | C₄H₉-(n) | " |
| 167 | [phenyl with CO₂C₁₀H₂₁-(n), O₂N, CH₃] | CONH₂ | C₄H₉-(n) | H | red |
| 168 | " | CN | " | C₄H₉-(n) | red |

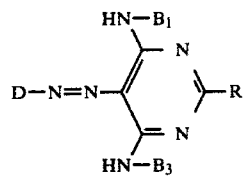

| Example | D | R | B₁ | B₃ | Hue on polyester/cotton |
|---|---|---|---|---|---|
| 169 | [phenyl with CO₂C₁₀H₂₁-(n), CH₃] | [phenyl] | H | H | golden yellow |
| 170 | [phenyl with CO₂C₁₀H₂₁-(n), O₂N, CH₃] | " | H | H | orange |
| 171 | [phenyl with CO₂C₁₀H₂₁-(i), CH₃] | " | H | [phenyl] | golden yellow |
| 172 | [phenyl with CO₂C₁₀H₂₁-(n), O₂N, CH₃] | " | H | " | orange |
| 173 | [phenyl with CO₂C₁₀H₂₁-(n), Br, Br] | " | C₂H₄-OCH₃ | CH₂-[phenyl] | orange |
| 174 | [phenyl with CO₂C₁₀H₂₁-(n), O₂N, CH₃] | " | " | " | red |
| 175 | [phenyl with CO₂-C₂H₄-O-phenyl, O₂N] | " | C₃H₆-OCH₃ | " | red |
| 176 | [phenyl with CO₂-CH₂-CH(C₂H₅)-C₄H₉, O₂N] | " | H | [phenyl] | orange |

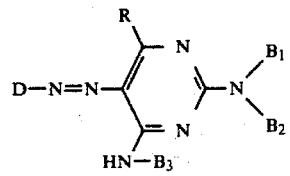

| Example | D | R | B₁=B₂ | B₃ | Hue on polyester/cotton |
|---|---|---|---|---|---|

-continued

| | | | | | |
|---|---|---|---|---|---|
| 177 | 2-CH3-C6H3-CO2C10H21(n) | C6H5 | C4H9—(n) | C6H5 | orange |
| 178 | 2-CH3-5-NO2-C6H3-CO2C10H21(n) | " | " | C3H6—OCH3 | red |
| 179 | 4-CH3-C6H4-O-CO-C10H21(n) | CH3 | C2H5 | C2H4—OCH3 | orange |
| 180 | 3,5-Br2-2-CH3-C6H2-CO2C10H21 | CH3 | " | C3H6—OCH3 | golden yellow |
| 181 | 3,5-Br2-4-CH3-C6H2-O-CO-C10H21(n) | CH3 | C4H9—(n) | C6H5 | " |
| 182 | 3-NO2-C6H4-CO2(C2H4O)2C4H9—(n) | CH3 | " | " | red |
| 183 | 2-CH3-5-NO2-C6H3-CO2-C2H4-O-C6H5 | CH3 | " | " | red |

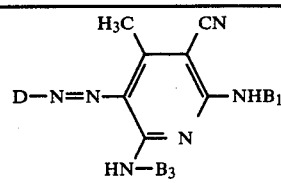

| Example | H2N—D | B1 | B3 | Hue on polyester, cotton and union fabrics |
|---|---|---|---|---|
| 184 | 3,5-Br2-4-H2N-C6H2-CONHCH2-CH(C2H5)(C4H9(n)) | —(CH2)2OC4H9—(n) | —(CH2)2OCH3 | yellowish orange |
| 185 | " | —C2H4—C6H5 | H | golden yellow |
| 186 | " | —CH2CH(CH3)—C6H5 | H | " |
| 187 | " | (CH2)3O(CH2)2OC6H5 | H | " |
| 188 | " | (CH2)2OC4H9—(n) | (CH2)2OC4H9—(n) | yellowish orange |
| 189 | " | C2H4C6H5 | C2H4C6H5 | " |
| 190 | " | (CH2)2OC4H9—(n) | H | golden yellow |
| 191 | " | —(CH2)3OC2H5 | —(CH2)3OC2H5 | yellowish orange |
| 192 | " | C2H4C6H5 | —C2H5 | " |
| 193 | " | " | —CH3 | " |
| 194 | " | C4H9—(n) | —C4H9—(n) | " |
| 195 | " | (CH2)3OCOC6H5 | (CH2)3OCOC6H5 | " |
| 196 | " | (CH2)2OCOC6H5 | (CH2)2OCOC6H5 | " |
| 197 | " | CH2C6H5 | H | golden yellow |
| 198 | " | (CH2)3OCH2C6H5 | H | " |
| 199 | " | (CH2)3O(CH2)2OC4H9—(n) | H | " |
| 200 | " | C2H4C6H11 | H | " |
| 201 | " | (CH2)3OC4H9(n) | (CH2)3OC4H9—(n) | yellowish orange |
| 202 | " | " | H | golden yellow |
| 203 | 3,5-Br2-4-H2N-C6H2-C(O)-NHC2H4C6H5 | C2H4—C6H5 | H | " |
| 204 | " | (CH2)3OCH3 | (CH2)3OCH3 | yellowish orange |
| 205 | " | (CH2)3O(CH2)2OC6H5 | H | golden yellow |
| 206 | " | (CH2)3OC4H9—(n) | H | golden yellow |
| 207 | " | (CH2)3OC2H5 | H | " |
| 208 | " | (CH2)3OC2H5 | (CH2)3OC2H5 | yellowish orange |
| 209 | " | (CH2)3OC4H9(n) | (CH2)3OC4H9(n) | yellowish orange |
| 210 | " | (CH2)2OC4H9(n) | (CH2)2OC4H9(n) | yellowish orange |

-continued

| | | | | |
|---|---|---|---|---|
| 211 | " | C₄H₉—(n) | H | golden yellow |
| 212 | ![structure: 3,5-dibromo-4-aminobenzamide with NHCH₂CH(CH₃)C₆H₅] | (CH₂)₃OCH₃ | (CH₂)₃OCH₃ | yellowish orange |
| 213 | " | (CH₂)₃OC₂H₅ | (CH₂)₃OC₂H₅ | yellowish orange |
| 214 | " | (CH₂)₃O(CH₂)₂OC₆H₅ | H | golden yellow |
| 215 | ![structure: 3-bromo-4-amino benzamide with NHCH₂CH(C₂H₅)C₄H₉(n)] | (CH₂)₂OCH₃ | (CH₂)₂OCH₃ | golden yellow |
| 216 | ![structure: 3-bromo-4-amino benzamide with NHCH₂CH(C₂H₅)C₄H₉(n)] | (CH₂)₃OCH₃ | (CH₂)₃OCH₃ | golden yellow |
| 217 | " | C₂H₄—C₆H₅ | H | " |
| 218 | ![structure: 3,4-dibromo-aminobenzene sulfonamide with C₂H₅/C₄H₉(n)] | (CH₂)₃OC₂H₅ | (CH₂)₃OC₂H₅ | yellowish orange |
| 219 | " | (CH₂)₃OCH₃ | (CH₂)₃OCH₃ | " |
| 220 | " | (CH₂)₃O(CH₂)₂OC₆H₅ | H | golden yellow |
| 221 | " | (CH₂)₂C₆H₅ | H | " |
| 222 | " | CH₂CH(CH₃)C₆H₅ | H | " |
| 223 | " | (CH₂)₂C₆H₅ | (CH₂)₂C₆H₅ | yellowish orange |
| 224 | " | (CH₂)₂OCH₃ | (CH₂)₂OCH₃ | " |
| 225 | " | (CH₂)₂OC₄H₉(n) | (CH₂)₂OC₄H₉(n) | " |
| 226 | ![structure: 3,5-dibromo-4-amino benzene sulfonamide with C₂H₄C₆H₅] | (CH₂)₃OCH₃ | (CH₂)₃OCH₃ | " |
| 227 | " | (CH₂)₃OC₂H₅ | (CH₂)₃OC₂H₅ | " |
| 228 | " | (CH₂)₂OC₄H₉(n) | (CH₂)₂OC₄H₉(n) | " |
| 229 | " | (CH₂)₂OCH₃ | (CH₂)₂OCH₃ | " |
| 230 | " | (CH₂)₃O(CH₂)₂OC₆H₅ | H | golden yellow |
| 231 | ![structure: 3-bromo-4-amino benzene sulfonamide with C₂H₅/C₄H₉(n)] | (CH₂)₃OCH₃ | (CH₂)₃OCH₃ | yellowish orange |
| 232 | " | C₂H₄C₆H₅ | H | golden yellow |
| 233 | ![structure: 3,5-dibromo-4-amino benzamide with NHC₈H₁₇(n)] | (CH₂)₂OCH₃ | (CH₂)₂OCH₃ | yellowish orange |
| 234 | " | (CH₂)₂C₆H₅ | (CH₂)₂C₆H₅ | " |
| 235 | " | (CH₂)₃OCH₃ | (CH₂)₃OCH₃ | " |
| 236 | " | C₂H₄C₆H₅ | H | golden yellow |
| 237 | " | (CH₂)₂O(C₄H₉)—(n) | " | " |
| 238 | " | (CH₂)₃O(CH₂)₂OC₆H₅ | H | " |
| 239 | ![structure: 3,5-dibromo-4-amino benzamide with NHCH(CH₃)(CH₂)₃CH(CH₃)₂] | (CH₂)₂OCH₃ | (CH₂)₂OCH₃ | yellowish orange |
| 240 | " | (CH₂)₂C₆H₅ | (CH₂)₂C₆H₅ | " |
| 241 | " | (CH₂)₃OCH₃ | (CH₂)₃OCH₃ | " |
| 242 | " | C₂H₄C₆H₅ | H | golden yellow |
| 243 | " | (CH₂)₃O(CH₂)₂OC₆H₅ | H | " |
| 244 | ![structure: 3,5-dibromo-4-amino benzene sulfonamide with NHC₈H₁₇(n)] | (CH₂)₂OCH₃ | (CH₂)₂OCH₃ | yellowish orange |
| 245 | " | (CH₂)₃OCH₃ | (CH₂)₃OCH₃ | " |
| 246 | " | C₂H₄C₆H₅ | C₂H₄C₆H₅ | " |
| 247 | " | C₂H₄C₆H₅ | H | golden yellow |
| 248 | " | (CH₂)₃O(CH₂)₂OC₆H₅ | H | " |

-continued

| | | | | |
|---|---|---|---|---|
| 249 | 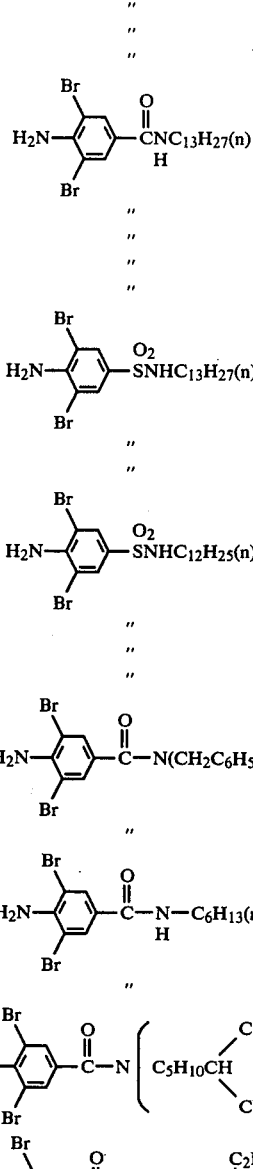 | (CH₂)₂OCH₃ | (CH₂)₂OCH₃ | yellowish orange |
| 250 | " | (CH₂)₃OCH₃ | (CH₂)₃OCH₃ | " |
| 251 | " | C₂H₄C₆H₅ | H | golden yellow |
| 252 | " | (CH₂)₃OCH₃ | H | " |
| 253 | 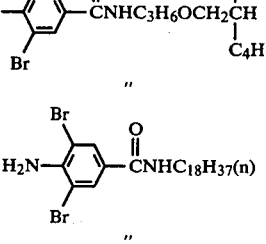 | (CH₂)₂OCH₃ | (CH₂)₂OCH₃ | yellowish orange |
| 254 | " | (CH₂)₃OCH₃ | (CH₂)₃OCH₃ | " |
| 255 | " | C₂H₄C₆H₅ | H | golden yellow |
| 256 | " | (CH₂)₂OCH₃ | H | " |
| 257 | " | (CH₂)₃OCH₃ | H | " |
| 258 | 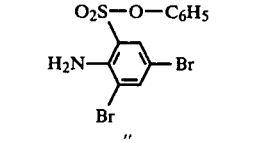 | (CH₂)₂OCH₃ | (CH₂)₂OCH₃ | yellowish orange |
| 259 | " | (CH₂)₃OCH₃ | (CH₂)₃OCH₃ | " |
| 260 | " | (CH₂)₃OCH₃ | H | golden yellow |
| 261 |  | (CH₂)₂OCH₃ | (CH₂)₂OCH₃ | yellowish orange |
| 262 | " | (CH₂)₃OCH₃ | (CH₂)₃OCH₃ | " |
| 263 | " | (CH₂)₃OCH₃ | H | golden yellow |
| 264 | " | C₂H₄C₆H₅ | H | " |
| 265 |  | (CH₂)₃OCH₃ | (CH₂)₃OCH₃ | yellowish orange |
| 266 | " | (CH₂)₂OCH₃ | (CH₂)₂OCH₃ | " |
| 267 | " | C₂H₄C₆H₅ | C₂H₄C₆H₅ | " |
| 268 |  | " | H | golden yellow |
| 269 |  | (CH₂)₂OCH₃ | (CH₂)₂OCH₃ | yellowish orange |
| 270 |  | C₂H₄C₆H₅ | H | golden yellow |
| 271 | " | (CH₂)₂OCH₃ | H | " |
| 272 |  | (CH₂)₂OCH₃ | H | " |
| 273 | " | (CH₂)₃OCH₃ | H | " |
| 274 |  | C₂H₄C₆H₅ | C₂H₄C₆H₅ | yellowish orange |
| 275 | " | " | H | golden yellow |

-continued

| # | Structure | R1 | R2 | Color |
|---|---|---|---|---|
| 276 | 2,6-dibromo-4-(S(O₂)-O-C₆H₅)aniline (Br, Br, H₂N, O₂S—O—C₆H₅) | C₂H₄C₆H₅ | C₂H₄C₆H₅ | yellowish orange |
| 277 | " | " | H | golden yellow |
| 278 | 2-(O₂S—OC₆H₅)-4-NO₂-aniline | (CH₂)₃OCH₃ | (CH₂)₃OCH₃ | red |
| 279 | " | (CH₂)₂OC₄H₉(n) | (CH₂)₂OC₄H₉(n) | " |
| 280 | 2-(O₂S—OC₆H₅)-4-NO₂-6-Br-aniline | (CH₂)₃OCH₃ | (CH₂)₃OCH₃ | " |
| 281 | " | (CH₂)₂OC₄H₉(n) | (CH₂)₂OC₄H₉(n) | " |
| 282 | " | C₂H₄C₆H₅ | H | " |
| 283 | 2-(O₂S—OC₆H₅)aniline | C₂H₄OC₄H₉(n) | C₂H₄C₆H₅ | golden yellow |
| 284 | " | C₂H₄C₆H₅ | H | " |
| 285 | " | C₃H₆OC₂H₄OC₆H₅ | H | " |
| 286 | " | " | C₃H₆OC₂H₄OC₆H₅ | " |
| 287 | " | C₂H₄C₆H₁₁ | C₂H₄C₆H₁₁ | " |
| 288 | 2,6-dibromo-4-(O₂SOC₆H₅)aniline | (CH₂)₃OCH₃ | (CH₂)₃OCH₃ | orange |
| 289 | " | (CH₂)₃OC₄H₉(n) | (CH₂)₃OC₄H₉(n) | " |
| 290 | " | —CH₂CH(CH₃)—C₆H₅ | H | " |
| 291 | " | (CH₂)₂OC₄H₉(n) | H | " |
| 292 | 4-(O₂SOC₆H₅)aniline | (CH₂)₃O(CH₂)₂OC₆H₅ | H | golden yellow |
| 293 | " | (CH₂)₂C₆H₅ | H | " |
| 294 | 2-(O₂S—O-(2-CH₃-C₆H₄))aniline | (CH₂)₃O(CH₂)₂OC₆H₅ | H | " |
| 295 | 2-(O₂S—O-(2,5-Cl₂-C₆H₃))aniline | (CH₂)₃O(CH₂)₂OC₆H₅ | H | " |
| 296 | 2-(O₂S—N(C₄H₉—n)₂)-4-NO₂-aniline | C₂H₄C₆H₅ | H | yellowish red |
| 297 | " | " | C₂H₄C₆H₅ | red |
| 298 | 2,4-dibromo-6-(O—C(CH₃)=N—C₆H₅)aniline | C₂H₄C₆H₅ | H | golden yellow |
| 299 | " | (CH₂)₃O(CH₂)₂OC₆H₅ | H | " |
| 300 | 2,4-dibromo-6-(O=C—N(C₄H₉—n)₂)aniline | (CH₂)₃O(CH₂)₂OC₆H₅ | H | " |

-continued

| | | | | |
|---|---|---|---|---|
| 301 | " | C2H4C6H5 | H | " |
| 302 | 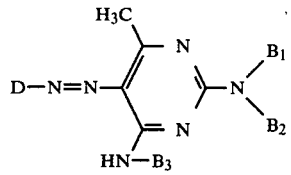 | C2H4C6H5 | H | yellowish red |
| 303 | " | " | C2H4C6H5 | red |
| 304 | 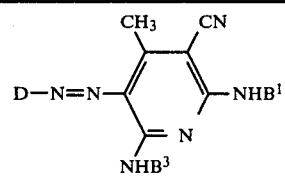 | (CH2)3O(CH2)2OC6H5 | H | golden yellow |

| Example | H2N—D | B1=B2 | B3 | Hue |
|---|---|---|---|---|
| 305 | 3,5-dibromo-4-amino-N-(2-ethylhexyl)benzamide | C4H9—n | C6H5 | golden yellow |
| 306 | " | " | C3H6OCH3 | " |
| 307 | " | CH3 | C2H4OC4H9—n | " |
| 308 | 2-amino-5-nitro-N-methyl-N-phenylbenzamide | C4H9—n | C3H6OCH3 | yellowish red |
| 309 | " | " | C3H6O—CH2—C6H5 | " |
| 310 | 2-amino-3,5-dibromophenyl phenyl sulfonate | CH3 | C2H4C6H5 | golden yellow |
| 311 | " | C4H9—n | C2H4C6H5 | " |
| 312 | " | " | C3H6OCH3 | " |
| 313 | 2-aminophenyl phenyl sulfonate | " | C2H4C6H5 | " |
| 314 | 3,5-dibromo-4-amino-N-(2-ethylhexyl)benzenesulfonamide | " | C3H6OCH3 | " |
| 315 | " | " | C2H4C6H5 | " |
| 316 | " | " | CH2C6H5 | " |

| Example | D | B1 | B3 | Hue |
|---|---|---|---|---|
| 317 | 2-methyl-5-nitro-decyl benzoate | (CH2)3OCH3 | CH(CH3)2 | red |
| 318 | 2-methyl-5-nitro-(2-methoxyethyl) benzoate | " | " | " |

-continued

| No. | Structure 1 | Structure 2 | Structure 3 | Structure 4 |
|---|---|---|---|---|
| 319 | 2-methyl-5-nitrophenyl-CO$_2$C$_2$H$_4$O-C$_6$H$_5$ | " | " | " |
| 320 | 2-methyl-5-nitrophenyl-CO$_2$C$_4$H$_9$—(n) | " | " | " |
| 321 | 2-methyl-5-nitrophenyl-CO$_2$-cyclohexyl | " | " | " |
| 322 | 2-methyl-5-nitrophenyl-CO$_2$C$_{10}$H$_{21}$ | CH(CH$_3$)$_2$ | " | " |
| 323 | 2-methyl-5-nitrophenyl-CO$_2$C$_2$H$_4$OCH$_3$ | " | " | " |
| 324 | 2-methyl-5-nitrophenyl-CO$_2$C$_2$H$_4$—O—C$_6$H$_5$ | " | " | " |
| 325 | 2-methyl-5-nitrophenyl-CO$_2$C$_{10}$H$_{21}$ | phenyl | " | " |
| 326 | 2-methyl-5-nitrophenyl-CO$_2$C$_2$H$_4$OCH$_3$ | " | " | " |
| 327 | 2-methyl-5-nitrophenyl-CO$_2$C$_2$H$_4$OC$_2$H$_5$ | " | " | " |
| 328 | 2-methyl-5-nitrophenyl-CO$_2$C$_2$H$_4$O-C$_6$H$_5$ | " | " | " |
| 329 | 2-methyl-5-nitrophenyl-CO$_2$C$_4$H$_9$—(n) | " | " | " |
| 330 | 2-methyl-5-nitrophenyl-CO$_2$C$_2$H$_4$OCH$_3$ | cyclohexyl | " | " |
| 331 | 2-methyl-5-nitrophenyl-CO$_2$C$_2$H$_4$O—C$_6$H$_5$ | " | " | " |
| 332 | 2-methyl-5-nitrophenyl-CO$_2$C$_2$H$_4$OCH$_3$ | phenyl | cyclohexyl | " |
| 333 | " | 4-methoxyphenyl | CH(CH$_3$)$_2$ | " |
| 334 | " | " | cyclohexyl | " |

We claim:
1. A process for dyeing and printing cellulosic textile material, comprising contacting said cellulosic textile material with a swelling agent and a dye wherein the dye used is a compound of the general formula I

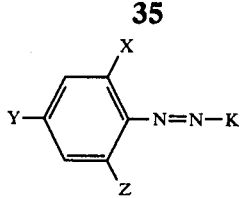

where
K is a radical of the formula

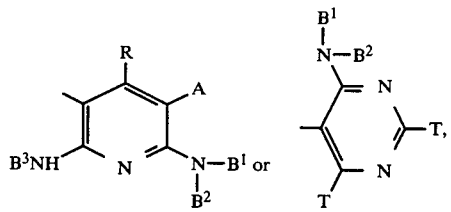

one of the radicals X and Y is a $C_2$–$C_{19}$-carboxylic acid ester group, a $C_3$–$C_{19}$-carboxamide group, a $C_4$–$C_{18}$-sulfonamide group, a $C_4$–$C_8$-alkylsulfone group, a $C_6$–$C_8$-arylsulfone group or a sulfonic acid aryl ester group and the remaining substituents X, Y and Z are hydrogen, bromine or methyl and Y may also be nitro, A is cyano or carbamyl, $B^1$, $B^2$ and $B^3$ independently of one another are aliphatic, cycloaliphatic, araliphatic or aromatic radicals,

is a saturated heterocyclic radical,

R is hydrogen or $C_1$–$C_3$-alkyl, one of the radicals T is a radical of the formula

and the other radical T is hydrogen, $C_1$–$C_4$-alkyl or phenyl.

2. A process as claimed in claim 1, wherein the dye used is a compound of the general formula

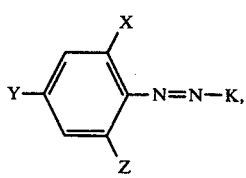

where
K is a radical of the formula

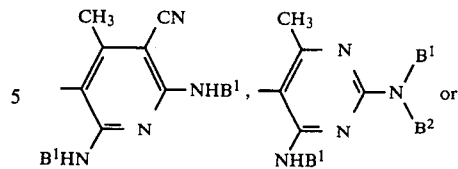

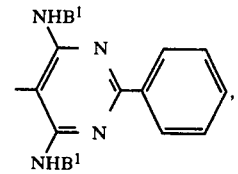

one of the radicals X and Y is a $C_2$–$C_{19}$-carboxylic acid ester group or a $C_3$–$C_{19}$-carboxamide group and the two remaining radicals X and Z or Y and Z are bromine, or X is a $C_2$–$C_{19}$-carboxylic acid ester group or a $C_3$–$C_{19}$-carboxamide group, Y is nitro and Z is hydrogen, $B^1$ is hydrogen, $C_1$–$C_8$-alkyl, allyl, $C_1$–$C_3$-alkyl which is substituted by $C_1$–$C_4$-alkoxy, phenoxy, phenoxyethoxy or phenyl, $C_5$–$C_{12}$-polyalkoxyalkyl, cyclohexyl or unsubstituted or substituted phenyl, $B^2$ is hydrogen or is defined like $B^1$ or $B^1$ and $B^2$ together with the nitrogen form a saturated 5-membered to 7-membered ring.

3. A process as claimed in claim 1, wherein the dye used is a compound of the formula

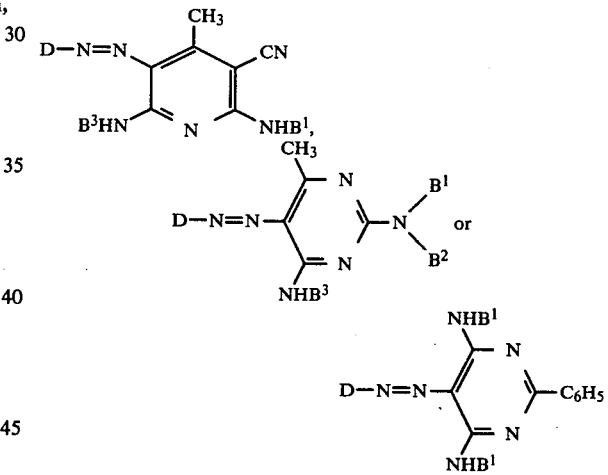

where
$B^1$, $B^2$ and $B^3$ have the stated meanings and
D is a radical of the formula

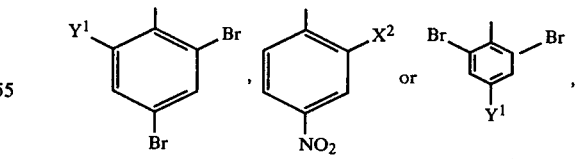

where
$X^1$ is a $C_4$–$C_{19}$-carboxylic acid ester group, a $C_4$–$C_{19}$-carboxamide group or a sulfonic acid phenyl ester group, $X^2$ is a $C_4$–$C_{19}$-carboxylic acid ester group or a $C_4$–$C_{19}$-carboxamide group and $Y^1$ is a $C_4$–$C_{19}$-carboxylic acid ester group, a $C_4$–$C_{19}$-carboxamide group, a $C_6$–$C_{18}$-sulfonamide group or a sulfonic acid phenyl ester group which is unsubstituted or substituted by chlorine or methyl.

* * * * *